(12) United States Patent
Osenar et al.

(10) Patent No.: US 7,306,864 B2
(45) Date of Patent: Dec. 11, 2007

(54) ONE-SHOT FABRICATION OF MEMBRANE-BASED ELECTROCHEMICAL CELL STACKS

(75) Inventors: Paul Osenar, Westford, MA (US); Paul Sabin, Needham, MA (US); Mohammad Enayetullah, Sharon, MA (US); Richard M. Formato, Grafton, MA (US)

(73) Assignee: Protonex Technology Corporation, Southborough, MA (US)

( * ) Notice: Subject to any disclaimer, the term of this patent is extended or adjusted under 35 U.S.C. 154(b) by 723 days.

(21) Appl. No.: 10/278,057

(22) Filed: Oct. 22, 2002

(65) Prior Publication Data
US 2003/0096153 A1 May 22, 2003

Related U.S. Application Data

(60) Provisional application No. 60/337,851, filed on Oct. 22, 2001.

(51) Int. Cl.
*H01M 8/00* (2006.01)
(52) U.S. Cl. .............................. 429/30; 429/34; 429/36
(58) Field of Classification Search .................. 429/30, 429/34, 35, 36, 37, 38
See application file for complete search history.

(56) References Cited

U.S. PATENT DOCUMENTS

| | | | |
|---|---|---|---|
| 3,846,176 A | 11/1974 | Kuhl | 136/86 |
| 4,397,917 A | 8/1983 | Chi et al. | 429/26 |
| 5,110,691 A | 5/1992 | Krasij et al. | 429/35 |
| 5,176,966 A | 1/1993 | Epp et al. | 429/26 |
| 5,264,299 A | 11/1993 | Krasij et al. | 429/30 |
| 5,453,331 A | 9/1995 | Bloom et al. | 429/35 |
| 5,523,175 A | 6/1996 | Beal et al. | 429/30 |
| 5,922,485 A | 7/1999 | Enami et al. | 429/26 |
| 6,080,503 A * | 6/2000 | Schmid et al. | 429/35 |
| 6,159,628 A | 12/2000 | Grasso et al. | 429/35 |
| 6,165,634 A | 12/2000 | Krasij et al. | 429/35 |
| 2001/0001052 A1 | 5/2001 | Bonk et al. | 429/32 |

FOREIGN PATENT DOCUMENTS

| | | |
|---|---|---|
| EP | 0 122 150 A2 | 10/1984 |
| WO | WO 02/43173 A1 | 5/2002 |
| WO | WO 02/093668 A1 | 11/2002 |
| WO | WO 02/093672 A2 | 11/2002 |

OTHER PUBLICATIONS

U.S. Appl. No. 09/854,362, filed May 15, 2001, Frank et al.
U.S. Appl. No. 09/855,018, filed May 15, 2001, Frank et al.

* cited by examiner

*Primary Examiner*—Patrick Joseph Ryan
*Assistant Examiner*—Monique Wills
(74) *Attorney, Agent, or Firm*—Linda M. Buckley; Christine C. O'Day; Edwards Angell Palmer & Dodge LLP

(57) ABSTRACT

The present invention provides membrane cassettes and stacks thereof which are suitable for a use in a variety of electrochemical and ion exchange applications. The present invention also provides methods of manufacturing the membrane cassettes and stacks of the invention. In certain preferred embodiments, the invention provides cassettes and stacks which are suitable for use in fuel cell applications.

33 Claims, 10 Drawing Sheets

100

ONE-SHOT FABRICATION OF MEMBRANE-BASED ELECTROCHEMICAL CELL STACKS

This application claims the benefit of U.S. Provisional Patent Application No. 60/337,851, filed Oct. 22, 2001, which application is incorporated by reference.

BACKGROUND OF THE INVENTION

1. Field of the Invention

This invention relates to the fabrication of membrane-based cassettes and stacks made via encapsulation of the component parts by a resin or thermoplastic matrix. The present invention includes an internal porting (e.g., manifolding) feature which eliminates the need for a separate step to seal individual components prior to the assembly of the cell cassette. Cassettes and stacks of the invention are particularly well-suited for use in various electrochemical applications, including fuel cells, as well as ion-exchange applications.

2. Background

Electrochemical cells, and particularly, PEM fuel cells are well known in the art. PEM fuel cells convert chemical energy to electrical power with virtually no environmental emissions and differ from a battery in that energy is not stored, but derived from supplied fuel. Therefore, a fuel cell is not tied to a charge/discharge cycle and can maintain a specific power output as long as fuel is continuously supplied. The large investments into fuel cell research and commercialization indicate the technology has considerable potential in the marketplace. However, the high cost of fuel cells when compared to conventional power generation technology has deterred their potentially widespread use. Costs of fabricating and assembling fuel cells can be significant, due to the materials and labor involved, and as much as 85% of a fuel cell's cost can be attributed to manufacturing.

A single cell PEM fuel cell consists of an anode and a cathode compartment separated by a thin, ionically conducting membrane. This catalyzed membrane, with or without gas diffusion layers, is often referred to as a membrane electrode assembly ("MEA"). Energy conversion begins when the reactants, reductants and oxidants, are supplied to the anode and cathode compartments, respectively, of the PEM fuel cell. Oxidants include pure oxygen, oxygen containing gases, such as air, and halogens, such as chlorine. Reductants, also referred to herein as fuel, include hydrogen, natural gas, methane, ethane, propane, butane, formaldehyde, methanol, ethanol, alcohol blends and other hydrogen rich organics. At the anode, the reductant is oxidized to produce protons, which migrate across the membrane to the cathode. At the cathode, the protons react with the oxidant. The overall electrochemical redox (reduction/oxidation) reaction is spontaneous, and energy is released. Throughout this reaction, the PEM serves to prevent the reductant and oxidant from mixing and to allow ionic transport to occur.

Current state of the art fuel cell designs comprise more than a single cell, and in fact, generally combine several MEAs, flow fields and separator plates in a series to form a fuel cell "stack"; thereby providing higher voltages and the significant power outputs needed for most applications. Depending on stack configuration, one or more separator plates may be utilized (referred to as a "bipolar stack") as part of the stack design. Their basic design function is to prevent mixing of the fuel, oxidant and cooling input streams within the fuel cell stack, while also providing stack structural support. These separator plates serve as current collectors for the electrodes and may also contain an array of lands and grooves formed in the surface of the plate contacting the MEA, in which case the separator plates are often referred to only as "bipolar plates" and the array of lands and grooves as "flow fields". Alternatively, the flow field may be a separate porous electrode layer. Ideal separator plates for use in fuel cell stacks are thin, lightweight, durable, highly conductive, corrosion resistant structures that can also, if desired, provide effective flow fields and thereby become bipolar plates.

In the flow fields, the lands conduct current from the electrodes, while the grooves between the lands serve to distribute the reactants utilized by a fuel cell, such as hydrogen, oxygen or air, evenly over the faces of the electrodes. The channels formed by the lands and grooves also facilitate removal of liquid reaction byproducts, such as water. A thin sheet of porous paper, cloth or felt, usually made from graphite or carbon, maybe positioned between each of the flow fields and the catalyzed faces of the MEA to support the MEA where it confronts grooves in the flow field to conduct current to the adjacent lands, and to aid in distributing reactants to the MEA. This thin sheet is normally termed a gas diffusion layer ("GDL"), and can be incorporated as part of the MEA.

Fuel cell stacks may also contain humidification channels within one or more of the coolant flow fields. These humidification channels provide a mechanism to humidify fuel and oxidants at a temperature as close as possible to the operating temperature of the fuel cell. This helps to prevent dehydration of the PEM as a high temperature differential between the gases entering the fuel cell and the temperature of the PEM causes water vapor to be transferred from the PEM to the fuel and oxidant streams. The location of the humidification channels can either be upstream from the MEA, such as in the fuel cell stacks described in U.S. Pat. No. 5,382,478 to Chow et al., and U.S. Pat. No. 6,066,408 to Vitale et al., or downstream from the MEA, such as those described in U.S. Pat. No. 5,176,966 to Epp et al.

Of necessity, certain stack components, such as the GDL portion of the MEA, are porous in order to provide for the distribution of reactants and byproducts into, out of, and within the fuel cell stack. Due to the number of elements within the stack, a means to prevent leakage of any liquid or gases between stack components (or outside of the stack) is needed. To this end, gaskets or other seals are usually provided between the surfaces of the membrane and/or MEA and other stack components, such as flow fields, and on portions of the stack periphery. These sealing means, whether elastomeric or adhesive materials, are generally placed upon, fitted, formed or directly applied to the particular surfaces being sealed. These processes are labor intensive and not conducive to high volume manufacturing and add to the high cost of fuel cells. The variability of these processes also results in poor manufacturing yield and device reliability.

Fuel cell stacks range in design depending upon power output, cooling, and other technical requirements, but may utilize a multitude of MEAs, seals, flow fields, and separator plates, in intricate assemblies that result in manufacturing difficulties and further increased fuel cell costs. For example, one fuel cell stack, described in U.S. Pat. No. 5,683,828, to Spear et al., employs bipolar plates containing up to ten separate layers adhesively bonded together, each layer having distinct channels that are dedicated to passing cooling water through the fuel cell stack for thermal management.

These multitudes of individual components are typically assembled into one sole complex unit to form the fuel cell stack. The stack is compressed, generally through the use of end plates and bolts, although banding or other methods may be used, such that the stack components are held tightly together to maintain electrical contact there between. These current means of applying compression add even more components and complexity to the stack and pose additional sealing requirements. Various attempts have been made in the fuel cell art to cure these deficiencies in fuel cell stack assembly design and thereby lower manufacturing costs.

Other conventional processes are described in U.S. Pat. No. 6,080,503, to Schmid et al., U.S. Pat. No. 4,397,917, to Chi et al., U.S. Pat. No. 5,176,966, to Epp et al. However, notable disadvantages have been associated with such conventional processes.

See, e.g., U.S. Pat. No. 6,080,503, to Schmid et al., which describes the replacement of gasket based seals within certain portions of the stack with an adhesive based material in the form of tapes, caulks or layers. However, assembly of that stack still requires manual alignment of the components during the adhesion process, in a manner not unlike caulking a seal, and sealing only occurs at those interfaces where adhesive has been applied through active placement.

Similarly, U.S. Pat. No. 4,397,917, to Chi et al., describes the fabrication of subunits within a fuel cell stack and is reported to provide ease in handling and testing. However, this design relies on conventional sealing among the components and between subunits. In addition, no manifolds internally penetrate the subunit.

See also, U.S. Pat. No. 5,176,966, to Epp et al., for its method of forming at least some of the required gaskets directly into the fuel cell stack assembly; U.S. Pat. No. 5,264,299, to Krasij et al., describes a fuel cell module having a PEM interposed between the two porous support layers which distribute reactant to the catalyst layers in which the peripheral portion of the support layers are sealed with an elastomeric material such that the PEM is joined with the support layers and the open pores of the support layers are filled with the elastomeric material making it fluid impermeable.

In contrast to these and other conventional processes, the present invention builds on the fuel cell cassette and method of manufacturing a fuel cell cassette described in our World Publication WO 02/43173 based on U.S. patent application Ser. No. 09/908,359 entitled, Electrochemical Polymer Electrolyte Membrane Cell Stacks and Manufacturing Methods Thereof, which application is incorporated herein by reference.

Briefly, WO 02/43173 detailed a three step process for the formation of fuel cell cassettes which included the following:

1) Sealing of unused manifold openings/ports on each of the particular flow fields (fuel, oxidant, and coolant). For example, in the case of the oxidant flow field, ports utilized for the distribution of fuel and coolant (on other layers) must be sealed about their perimeter to prevent the mixing of these input streams.
2) Sealing of all the ports within the membrane electrode assemblies (MEA) to prevent the leakage of the reactants within the MEA layers.
3) Layering these components (appropriately sealed as described) within a mold or fixture in a method prescribed by the particular stack design. Once the pieces are assembled within the fixture, a resin is introduced about the periphery. Using vacuum transfer molding or injection molding techniques, the resin is forced into the edges of the cassette assembly. Once hardened, it provides structural support and edge sealing over the assembly.

The resulting fuel cell cassette is then transformed into a fuel cell stack with the addition of end plates. Such a construction provides appropriate manifolding and a means of compression.

However, despite the numerous conventional processes available to those skilled in the art, and even in light of our own advancements in this field, there remains a need for improved cassettes and stacks. In particular, it would be highly desirable to develop fuel cell stacks and cassettes with enhanced reliability, and with further reductions in labor and costs.

SUMMARY OF THE INVENTION

The present invention provides notable improvements over conventional processes, including those described above. In particular, the present invention allows for the formation of an internal porting (or manifolding) within the encapsulation step. Indeed, due to the novel design of the present invention, there is no need for the separate step of port sealing individual components prior to the assembly of the fuel cell cassette. Thus, in a preferred aspect of the invention, the sealing of unused manifold openings/ports within each particular flow field and the MEA occurs simultaneously for all components of the fuel cell cassette assembly and simultaneously with the edge encapsulation of the assembled fuel cell cassette components.

The fuel cell cassette can be manufactured from the same materials as described in the above referenced U.S. patent application Ser. No. 09/908,359. The basic principle exploited allows for the edge-sealing material to block certain ports while leaving others open, based on the number, shape and placement of holes and channels cut within the flow fields. This design and process would be especially useful for the formation of fuel cell cassettes via injection molding techniques. As in the previous patent application, this innovation allows for the production of fuel cell stacks with a minimum of labor, thereby further reducing the cost of these systems.

The fuel cell cassettes of the present invention may be used in fuel cell systems such as PEM fuel cells based on hydrogen or direct methanol as well as alkaline fuel cells. The fuel cell cassettes of the present invention may also be used in a host of electrochemical applications that utilize electrolyte membranes other than the fuel cell systems discussed above. These applications include but are not limited to batteries, methanol/air cells, electrolyzers, concentrators, compressors and reactors. In addition, the present invention may have significant utility in the manufacture of filtration cassettes, as it is a substantial improvement over previously known methods of producing filtration cassettes.

Related methods and other aspects of the invention are discussed infra.

DETAILED DESCRIPTION OF THE INVENTION

Figure 1:
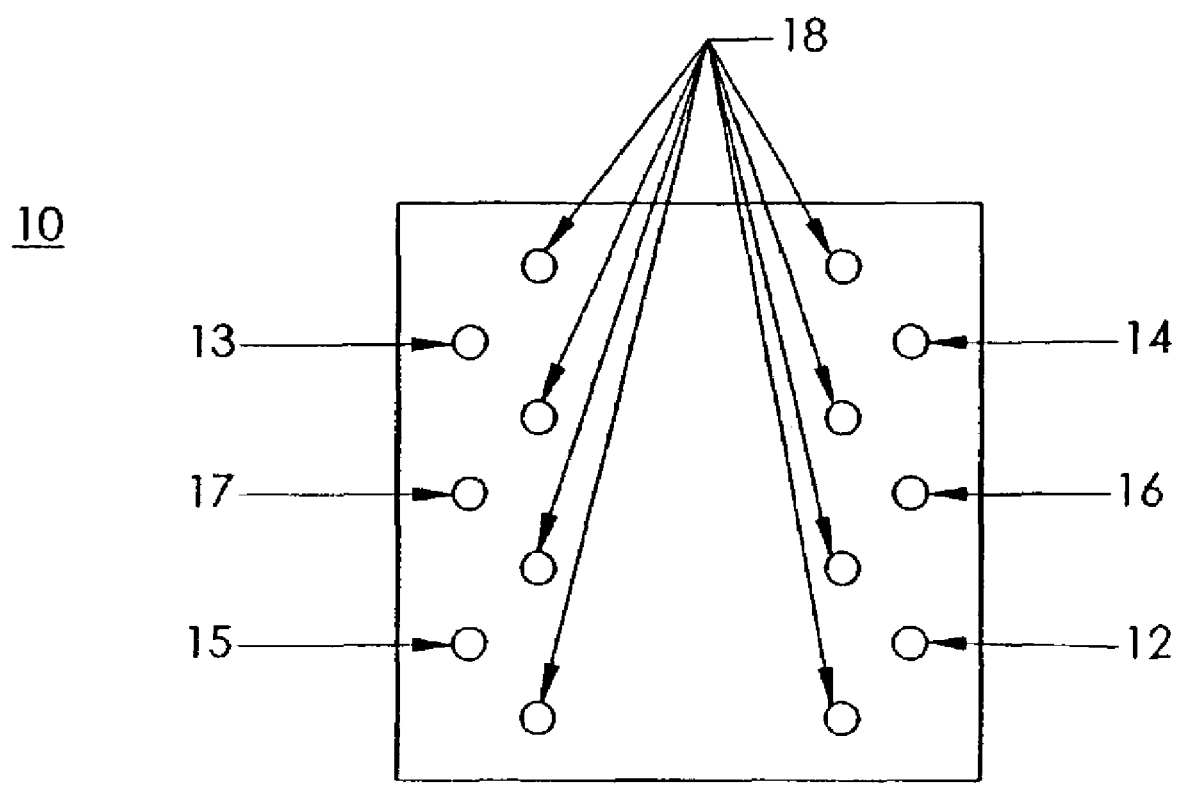
FIG. 1 shows a manifold opening and injection hole pattern for the MEA and separator plate (including labels on the injection holes and manifold holes) in a preferred embodiment of the invention.

The present invention provides a variety of cassettes suitable for use in electrochemical applications and ion exchange applications. As noted above, cassettes of the invention are particularly well-suited for use in fuel cells.

Cassettes of the invention generally comprise a membrane assembly and a first and second reagent flow field. The membrane assembly has at least one reagent manifold opening and at least one sealant manifold opening extending through the thickness thereof. Each of the first and second reagent flow fields also have at least one reagent manifold opening and at least one sealant manifold opening extending through the thickness thereof. Preferably, the membrane assembly, the first reagent flow field and the second reagent flow field are assembled relative to each other such that the reagent manifold openings are aligned, and at least a portion of each sealant manifold opening are aligned.

The peripheral edges of the membrane assembly, the first reagent flow field, and the second reagent flow field are encapsulated together by a resin such that the periphery of the cassette is encapsulated by the resin. A sealant is introduced into the sealant manifold openings to enclose those reactant manifold openings which are not intended to deliver material, e.g., gas, liquid or suspension, to a particular flow field. To achieve isolation of those reactant manifolds not delivering material to a particular flow field, e.g., unused reactant manifolds, the resin applied to the periphery of the cassette is contacted with at least a portion of the sealant introduced into the sealant manifold. Alternately, an unused manifold which is distant from the periphery of the cassette may be isolated from a flow field by enclosing with sealant introduced to the flow field through one or more sealant manifold openings such that the sealant introduced into the sealant manifold substantially encloses the reagent manifold. Although complete enclosure of the reagent manifold is preferred such that the sealant forms a ring completely surrounding the reagent manifold opening, enclosures which comprise one or more minor apertures may also be acceptable in certain situations. Typically, if the rate of fluid or material escape from the reagent manifold into the flow field does not impair the performance of the cassette or stack then such sealant enclosures are also acceptable.

In other preferred embodiments, isolation of those unused reactant manifolds can be achieved by virtue of the resin alone, e.g., the resin being introduced into the cassette by a channel opening to the periphery of one or more flow field layers thereby isolates the unused reactant manifold from the flow field. For certain cassettes which isolate manifolds by introducing resin into channels opening to the periphery of the cassette, the sealant manifold may not be necessary such that the MEA and any non-porous layers may optionally omit the sealant manifold openings.

Preferred cassettes suitable for use in electrochemical and fuel cell applications further include at least two electrodes which are preferably integrated into the membrane assembly layer of the cassette. In particularly preferred embodiments, the membrane assembly is a membrane electrode assembly having a non-porous, ion-conductive layer interposed between two electrodes and two gas diffusion layers.

For use in fuel cell applications, cassettes of the invention are typically utilized in the form of a stacked assembly comprising the following components: membrane electrode assemblies (MEA), flow fields, and separator plates.

Preferred fuel cell cassettes of the invention comprise a membrane electrode assembly having at least one reactant manifold opening extending through the thickness thereof and at least one sealant manifold opening extending through the thickness thereof; a fuel flow field having at least one reactant manifold opening extending through the thickness thereof and at least one sealant manifold opening extending through the thickness thereof; an oxidant flow field having at least one reactant manifold opening extending through the thickness thereof and at least one sealant manifold opening extending through the thickness thereof.

The membrane electrode assembly, the fuel flow field, and the oxidant flow field are typically assembled relative to each other such that the reactant manifold openings are aligned, and at least a portion of the sealant manifold openings are aligned. The peripheral edges of the membrane electrode assembly, the fuel flow field, and the oxidant flow field are encapsulated together by a resin such that the periphery of the fuel cell cassette is encapsulated by the resin and a sealant is introduced into the sealant manifold openings to enclose those reactant manifold openings which are not intended to deliver material to a particular flow field. To achieve encapsulation, the resin applied to the periphery of the fuel cell cassette is contacted with at least a portion of the sealant introduced into the sealant manifold. Alternately, encapsulation can be achieved by virtue of the sealant alone, e.g., sealant being forced into the cassette through an opening in the periphery of one or more flow field layers.

Other preferred fuel cell cassettes of the invention further comprise a non-porous separator plate having at least one manifold opening extending through the thickness thereof. The membrane electrode assembly, the fuel flow field, the oxidant flow field, and the non-porous separator plate are then assembled relative to each other such that the reactant manifold openings are aligned, and at least a portion of the sealant manifold openings are aligned. As in the earlier described embodiments, the peripheral edges of the membrane electrode assembly, the fuel flow field, the oxidant flow field, and the nonporous separator plate are encapsulated together by a resin such that the periphery of the fuel cell cassette is encapsulated by the resin and a sealant is introduced into the sealant manifold openings to enclose those reactant manifold openings which are not intended to deliver material to a particular flow field. Encapsulation is achieved as in the case above.

In another preferred embodiment, fuel cell cassettes of the invention further comprise a coolant flow field having at least two manifold openings extending through the thickness thereof and at least one sealant manifold opening extending through the thickness thereof. The components are assembled relative to each other such that the reactant manifold openings are aligned, and at least a portion of the sealant manifold openings are aligned. The peripheral edges of the membrane electrode assembly, the fuel flow field, the oxidant flow field, non-porous separator plate, and the coolant flow field are encapsulated together by a resin such that the periphery of the fuel cell cassette is encapsulated by the resin and a sealant is introduced into the sealant manifold openings to enclose those reactant manifold openings which are not intended to deliver material to a particular flow field. Encapsulation is achieved as in the case above.

Cassettes suitable for use in fuel cell, electrochemical and ion exchange applications may also be constructed using one or more bipolar plates. Typically, two reagents are selectively delivered to opposing parallel faces of the bipolar plate thereby reducing the number of individual components being incorporated into to the cassette. In preferred embodiments, cassettes having one or more bipolar plates comprise a membrane electrode assembly with at least one sealant manifold opening extending through the thickness thereof. A bipolar plate also is included which comprises an oxidant flow field, a fuel flow field, and a separator plate which is interposed between the fuel flow field and the oxidant flow field. The bipolar plate has at least one manifold opening extending through the thickness thereof and at least one sealant manifold opening extending through the thickness thereof. The membrane electrode assembly, and the bipolar plate are assembled relative to each other such that the reactant manifold openings are aligned, and at least a portion of each sealant manifold openings are aligned. The peripheral edges of the membrane electrode assembly, the bipolar plate are encapsulated together by a resin such that the periphery of the fuel cell cassette is encapsulated by the resin and a sealant is introduced into the sealant manifold openings to enclose those manifold openings which are not intended to deliver material to a particular flow field. Encapsulation is achieved as described above.

In another aspect, the present invention provides stacks suitable for use in fuel cells, electrochemical or ion exchange applications. Stacks of the invention comprise at least one cassette of the present invention, and at least one end plate having openings which align with the reagent manifold openings of the cassette. Each cassette is assembled relative to each other such that the reagent manifold openings are aligned. The end plate is assembled on the top and/or bottom of the stack of fuel cell cassettes such that the openings in the end plates align with the reagent manifold openings.

In accordance with the present invention, at least one of the end plates is preferably composed of a thermoset polymer, a thermoplastic polymer, metal or a metal alloy. In alternate embodiments, at least one of the end plates is composed of a filled polymer composite. Preferably, the filled polymer composite is a glass fiber reinforced thermoplastic or a graphite reinforced thermoplastic.

The means by which the end plates and fuel cell cassettes are assembled to form the fuel cell stack provided by the present invention is not particularly limited and may include compression gasket seals and co-encapsulation in a resin and/or sealant. In preferred embodiments, the end plate is assembled with the fuel cell cassette prior to encapsulation by the resin and prior to introduction of the sealant such that the end plate and fuel cell cassette are encapsulated and sealed in combination, e.g., simultaneously.

In other preferred embodiments of the present invention, one or more fuel cell cassettes are manufactured, then aligned in a stack together with one or more compression gaskets and end plates. A compression means such as through bolt, tie downs or other mechanical fasteners are attached to the fuel cell stack to mechanically seal the fuel cell cassettes and end plates.

In yet another aspect, the present invention provides methods of manufacturing cassettes of the invention for use in fuel cells, electrochemical or ion exchange applications. Methods of the invention comprise providing the components of the cassette as follows:

(a) providing at least one membrane assembly having at least one reagent manifold opening extending through the thickness thereof and at least one sealant manifold opening extending through the thickness thereof;

(b) providing at least one first reagent flow field having at least one reagent manifold opening extending through the thickness thereof and at least one sealant manifold opening extending through the thickness thereof;

(c) providing at least one second reagent flow field having at least one reagent manifold opening extending through the thickness thereof and at least one sealant manifold opening extending through the thickness thereof;

(d) assembling components (a) to (c) relative to each other such that the reagent manifold openings are aligned, and at least a portion of the sealant manifold openings are aligned;

(e) sealing the periphery of the cassette and a portion of the cassette surrounding the sealant manifold; and (f) introducing the sealant into the sealant manifold openings to enclose those reagent manifold openings which are not intended to deliver material to a particular flow field.

Preferably, the sealing step is achieved by applying a pressure differential to the cassette such that the peripheral edges of the membrane electrode assembly, the first reagent flow field, and the second reagent flow field are encapsulated together by a resin. In that way, the periphery of the cassette is encapsulated by the resin.

In particularly preferred cassette manufacturing methods of the present invention, the sealing step further comprises the steps of surrounding the stacked formation with a resin; introducing a sealant into the sealant manifold openings; applying a pressure differential means to the stacked formation for a predetermined interval such that the resin is introduced into the peripheral edges of the stacked formation and such that the sealant is introduced into a portion of the cassette surrounding the sealant manifold openings; allowing the sealant to solidify thereby enclosing those manifold openings of reagent manifold containing a reagent that does not correspond to a reagent for distribution to a particular flow field; and allowing the resin to solidify thereby forming a bond between the peripheral edges of the membrane assembly and the first and second reactant flow fields such that the periphery of the stack is encapsulated within the resin.

Pressure differential means could include pulling a vacuum within the assembly, i.e. through the reactant manifolds (also known as vacuum assisted resin transfer molding). Alternatively a pressure differential could be realized with the injection of resin and/or sealant from outside the assembly, allowing for suitable venting, i.e. through the reactant manifolds (also known as injection molding).

Methods of the invention may further comprise providing at least one coolant flow field. In particular, in addition to providing the components listed above, there also is provided at least one coolant flow field having at least one reagent manifold opening extending through the thickness thereof and at least one sealant manifold opening extending through the thickness thereof.

The invention further provides methods of manufacturing stacks of the invention. In preferred stack manufacturing methods provided by the present invention, the end plate is assembled with the fuel cell cassette prior to encapsulation by the resin and prior to introduction of the sealant such that the end plate and fuel cell cassette are encapsulated and sealed in combination.

In other preferred stack manufacturing methods provided by the present invention, the end plate is attached to the fuel cell cassette(s) after encapsulation in resin and introduction of the sealant into the sealant manifold openings. Typically, end plates which are attached after resin encapsulation are connected to the cassette by a compressive seal. In particularly preferred embodiments, the compressive seal may optionally comprise a gasket between the cassette and the end plate to insure a liquid or gas tight seal in the connection of the end plate and cassette. Alternatively, the end plate or the surface of the cassette may further include a sealing mechanism such that applying a compressive force to the aligned assembly of the cassette and the end plate results in the formation of a gas or liquid tight seal.

The present invention further provides methods of manufacturing the stacks which are suitable for use in fuel cell, electrochemical or ion exchange applications. The manufacturing method comprises the steps of assembling a stack comprising:

(a) at least one cassette and at least one end plate wherein each of the cassette(s) and end plate(s) have openings for at least one reagent manifold, wherein the cassettes are arranged in the stack such that the reactant manifold openings of each cassette are aligned to form at least one reactant manifold channel;

(b) at least one end plate attached to the top and/or bottom of the stack of cassettes such that the reactant manifold openings of the end plates align with the reactant channels of the stack of cassettes; and applying a compression means to seal the end plates and the cassettes into the stack.

In a preferred embodiment of the invention, cassettes and stacks of the invention comprise at least one manifold for delivery of a reagent to various flow fields. More preferred cassettes and stacks comprise two or more manifolds for delivery of reagents to the various flow fields of the cassette. In certain embodiments, in which one of the reagents is an oxidant such as air, dioxygen, or a gaseous mixture comprising dioxygen, nitrous oxide or another gaseous oxidant, the gaseous reagent may be delivered via a manifold or by providing one or more apertures connecting the atmosphere to the oxidant flow field such that the gaseous oxidant or other reagent may be delivered to the flow field by diffusion into the flow field from the surrounding atmosphere. In preferred embodiments, air is typically used for the oxidant, the oxidant flow field having apertures to the ambient atmosphere.

Figure 2A:
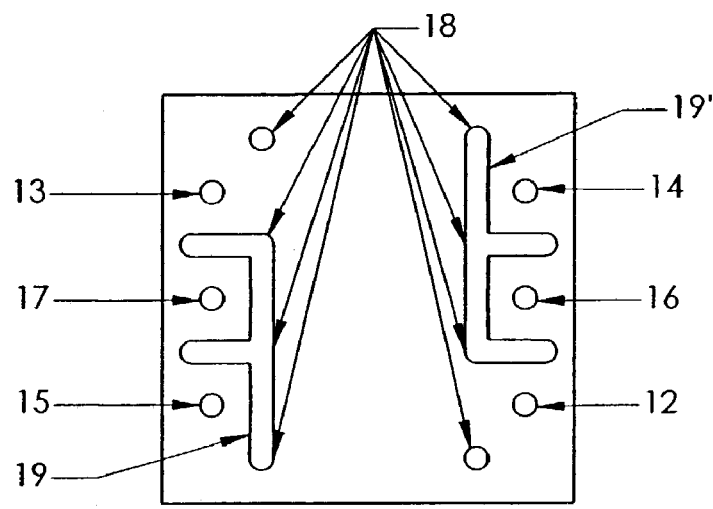
FIGS. 2A-C show a manifold opening and injection hole/channel patterns for each of the flow fields (including labels on the injection holes and manifold holes) in a preferred embodiment of the invention.
Figure 2B:
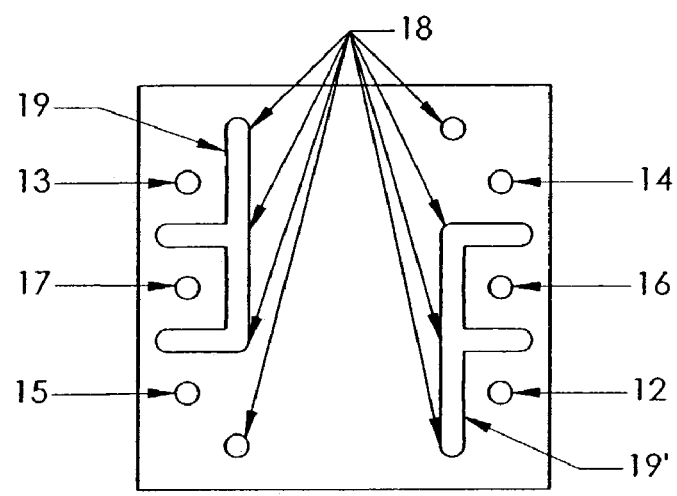
Figure 2C:
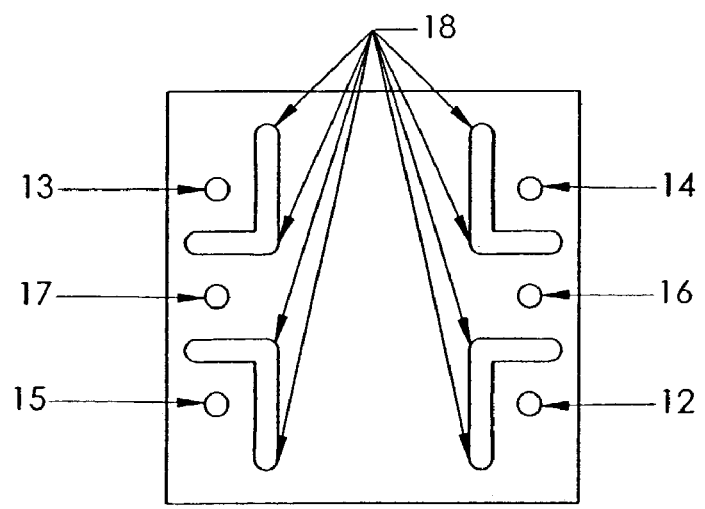

In a preferred embodiment of the invention, the flow fields are formed from wire mesh screens. Other flow field structures which are well known to the skilled artisan could be utilized as well. In a preferred embodiment of the invention, the MEA is made via hot-pressing catalyzed carbon paper onto both sides of a Nafion® perfluorinated sulfonic acid membrane, available commercially from E. I. duPont de Nemours and Company, U.S.A., (again see the specification of the above mentioned patent application), but any MEA known to those skilled in the art could be utilized for the present invention. It is generally preferred that all of the components be cut to roughly the same shape and size perimeter. By way of illustration, two series of holes are created in the MEAs and separator plates, two sets for the manifolding of fuel, oxidant, and cooling (an inlet at one portion and an outlet at another for each flow, see FIG. 1). Another set of holes is created by which a sealing resin can be introduced while the encapsulation of the assembly is accomplished (see FIG. 1). Lastly, flow fields are cut from metal mesh screen with the same manifold holes as in the separator plates and MEAs. In addition, channels are cut in the screens that line up with the injection holes in the other elements of the cassette. Three separate patterns of channels are needed; one for each of the flow fields (corresponding to the distribution of fuel, oxidant, and coolant—see FIG. 2). The placement of the holes and channels is described in more detail below. FIG. 3 shows several variations of the flow field patterns that may be useful.

The layer size and number of layers in the cassettes and stacks of the invention are not particularly limited. Moreover, the layer size and number of layers the fuel cell cassettes and fuel cell cassettes of the invention are not particularly limited. Typically each flow field and/or membrane assembly will be between about 1 cm$^2$ and about 1 m$^2$, however larger and smaller flow field layers and/or membrane assembly layers may be suitable in certain applications. The layer size and number of layers the fuel cell cassettes and fuel cell cassettes of the invention are capable of producing a sufficient power supply for a variety of applications. Frequently the power output fuel cell cassettes and fuel cell cassettes of the invention will range from about 0.1 W to about 100 kW or more preferably from about 0.5 W to about 10 kW.

Figure 3A:
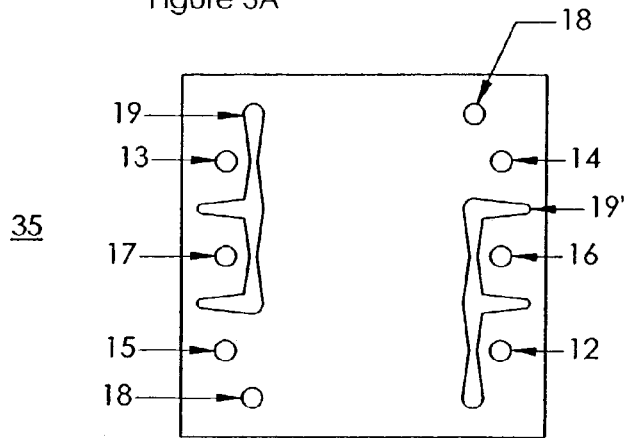
FIGS. 3A-C show a manifold opening and injection hole/channel pattern variations for flow fields (MEA and separator plates have manifold and injection ports as shown without channels, see FIG. 1).
Figure 3B:
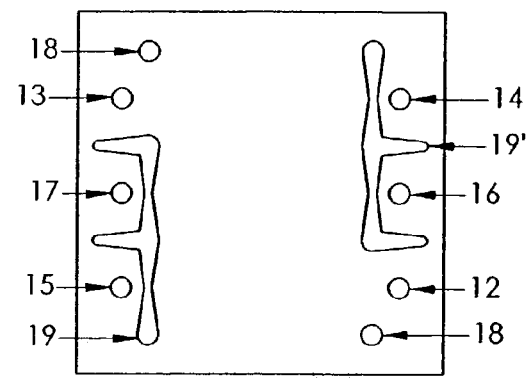
Figure 3C:
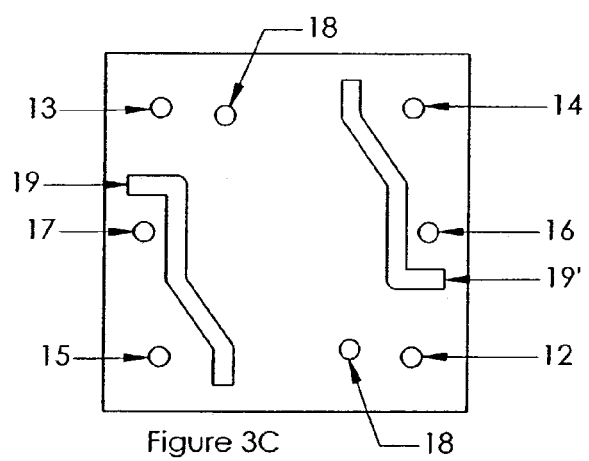
Figure 4:
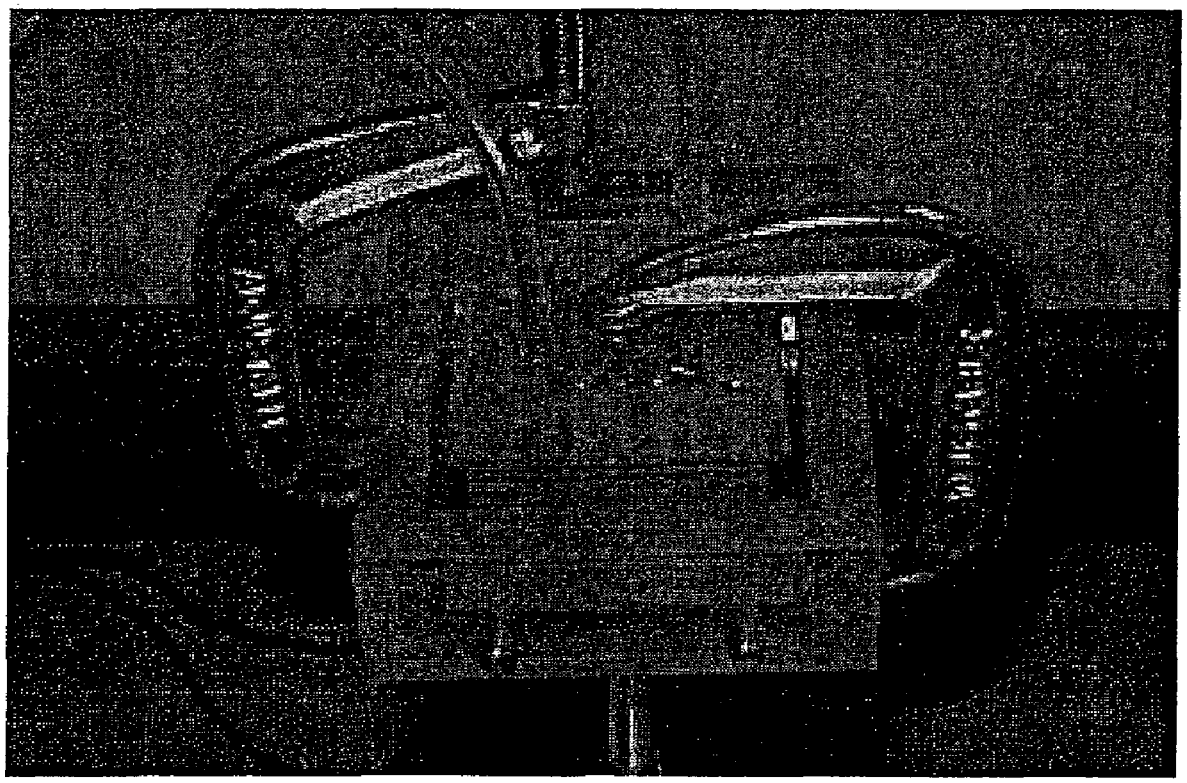
FIG. 4 shows a fuel cell cassette assembly within the mold prior to encapsulation

Referring now to FIGS. 3 and 4, each of the components described above are assembled according to the desired fuel cell cassette design (such as number of units cells, number and placement of cooling layers). The most basic design would include a fuel flow field 35, a MEA 10 (represented by FIG. 1), and an oxidant flow field 30 as the unit cell. Fuel cell cassettes 50 comprising assemblies with multiple unit cells would require the addition of one separator plate 6 (represented by the pattern shown in FIG. 1) in between each unit cell. The addition of a cooling layer requires the addition of a separator plate 6 and a cooling flow field 40 are added to the assembly 50. Regardless of the particular design, the components are assembled in the desired design such that the injection holes and manifold openings of each component in the assembly are aligned and the assembly is placed within a mold or cavity 60 (see FIG. 4). The assembly 50 is held in place within the mold by a top plate 130 with an appropriate means of compression 70 (i.e. a simple clamp).

Figure 5A:
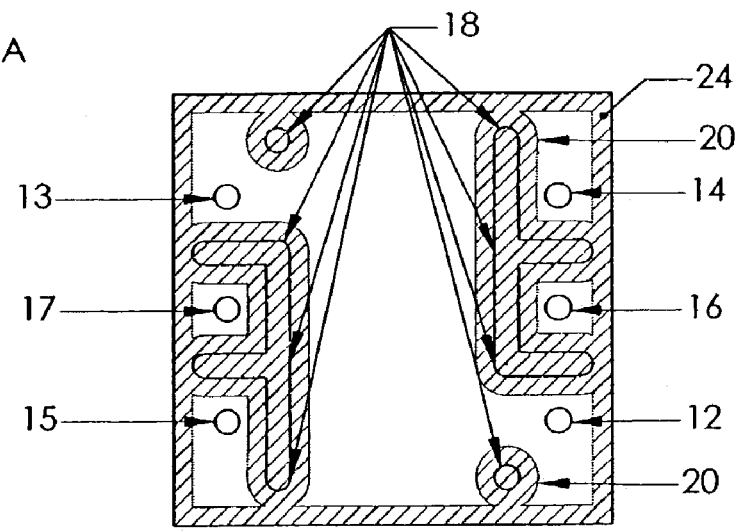
FIGS. 5A-C show patterns for each of the flow fields after encapsulation (including labels on the manifold holes).
Figure 5B:
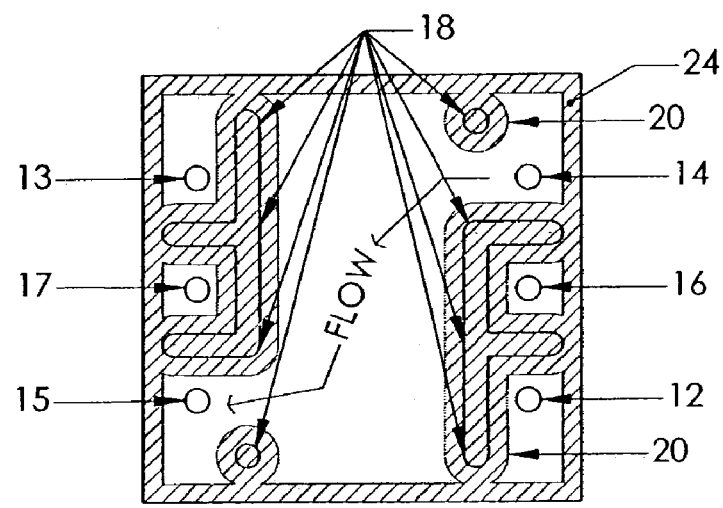
Figure 5C:
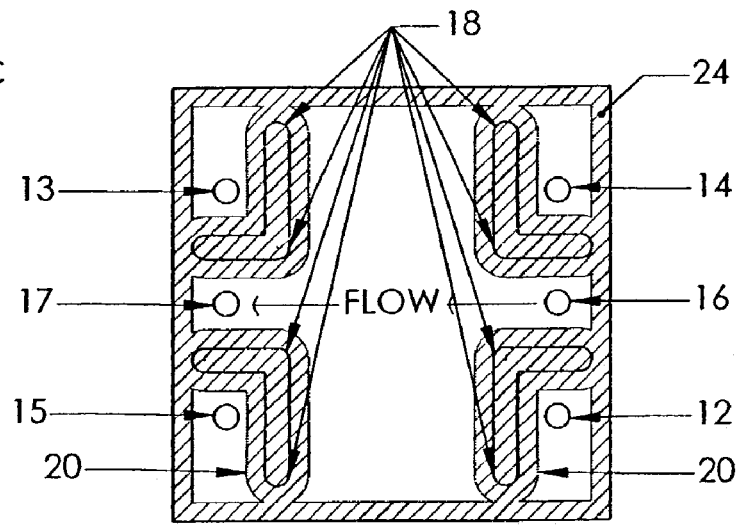
Figure 6:
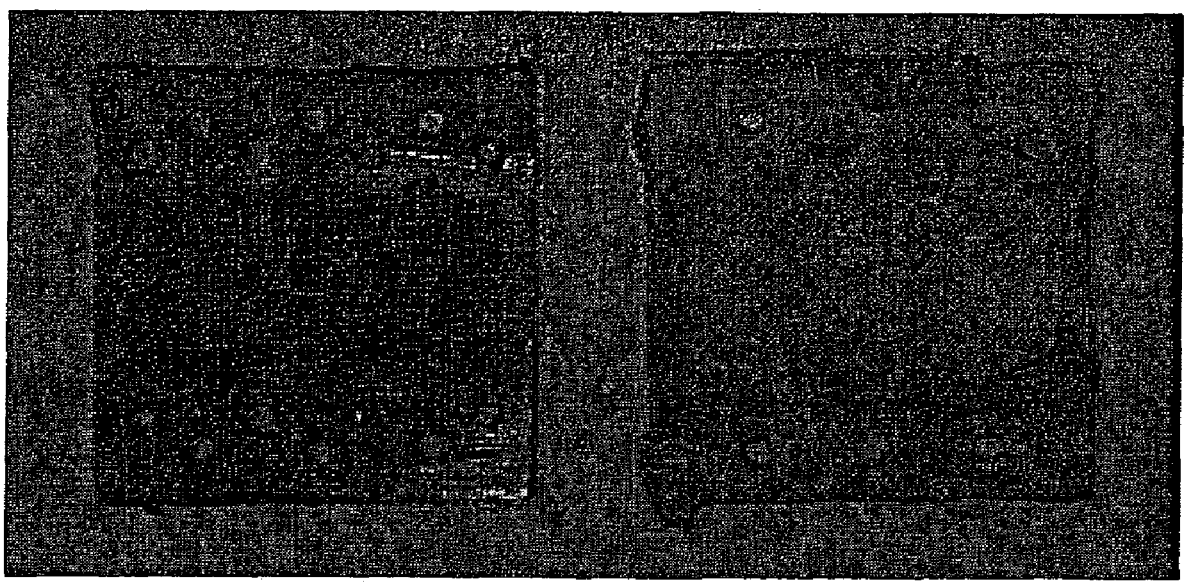
FIG. 6 shows an image of patterns for each of the flow fields after encapsulation.

Referring in particular to FIG. 4, to encapsulate the fuel cell cassette assembly 50, a resin is introduced around the periphery, as well as within the injection holes of all assembled components. A vacuum is then pulled via the top plate through each of the manifold holes within the assembly. The pressure differential pulls resin into the edges of the assembly thereby encapsulating all the edges of the components in the assembly together and forming the assembly into a fuel cell cassette as described in U.S. patent application Ser. No. 09/908,359. In addition, the same pressure differential pulls the resin introduced into the injection holes into the channels cut in each of the flow field components. The resin is drawn more quickly into the open channels than into the flow field material. The result is the sealing of each manifold around which the channels are cut. The result for each of the flow fields is depicted in FIGS. 5 and 6. For example, in the case of the cooling flow field shown 40 (FIG. 2C and FIG. 5C), the cooling manifold ports 16 and 17 remain open after the encapsulation event, while the fuel (14 and 15) and oxidant (12 and 13) manifolds have been closed on this particular layer. In the cassette assembly, each flow field is appropriately sealed such that only the manifold ports of interest remain open on each individual layer, the others are enclosed by the channels 19 and 19' which are now sealed with resin 24 or sealant 20.

The resin 24 or sealant 20 used for encapsulation is selected such that it has the required chemical and mechanical properties for the conditions found in an operating fuel cell system (oxidative stability, for example). Appropriate resins/sealants include both thermoplastics and thermoset elastomers. Preferred thermoplastics include thermoplastic olefin elastomers, thermoplastic, polyurethanes, plastomers, polypropylene, polyethylene, polytetrafluoroethylene, fluorinated polypropylene and polystyrene. Preferred thermoset elastomers include epoxy resins, urethanes, silicones, fluorosilicones, and vinyl esters.

The shape and placement of the channels are significant in that resin flow can be controlled via these patterns. Indeed, the resin flows faster in the open areas defined by the channels in the screen than through the screen itself. In the patterns shown in FIG. 6, an individual manifold is sealed via the flow of the resin from the two closest resin injection ports. While the vacuum (or other pressure differential) is applied, the resin flows from each of these injection holes down the channels (see the resulting resin patterns in FIGS. 5 and 6). The encapsulation step is complete when the resin flows from each of the injection holes meet and seal off the appropriate ports. Ports that are not meant to be sealed have no channels cut in the adjacent injection holes. As the pressure differential is applied, resin still flows radially from the injection port but at a rate too slow to close off the associated port (again see the resulting resin patterns in FIG. 5).

Figure 7A:
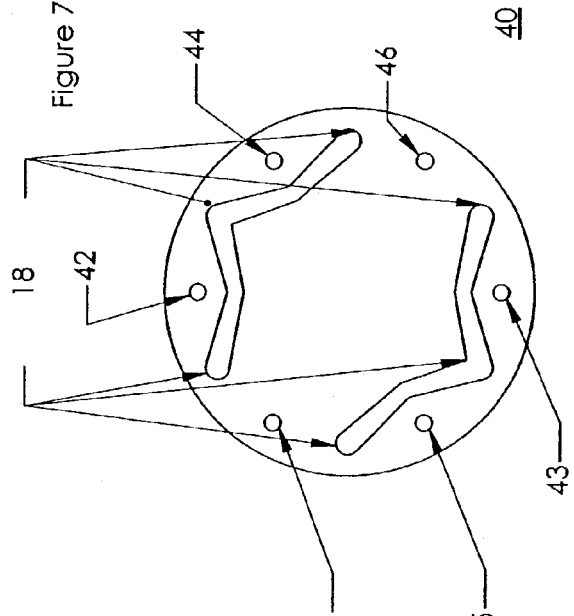
FIGS. 7A-C show alternative patterns for a) MEA and separator plate, b) flow field screen, and c) flow field screen after the encapsulation step.
Figure 7C:
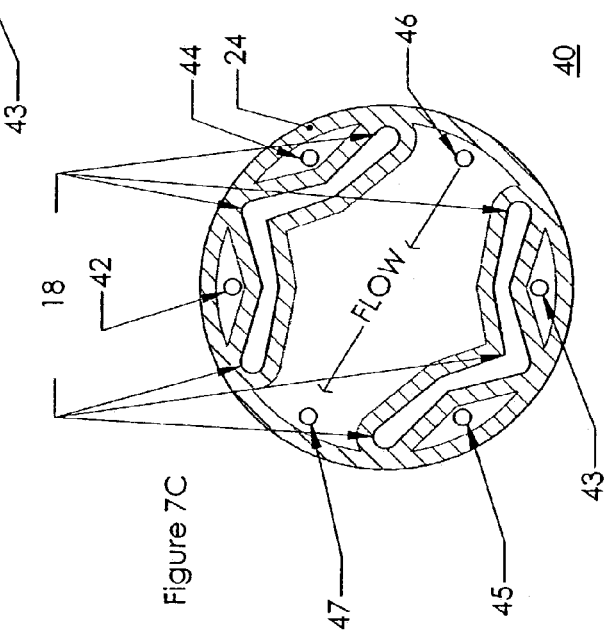
Figure 7B:
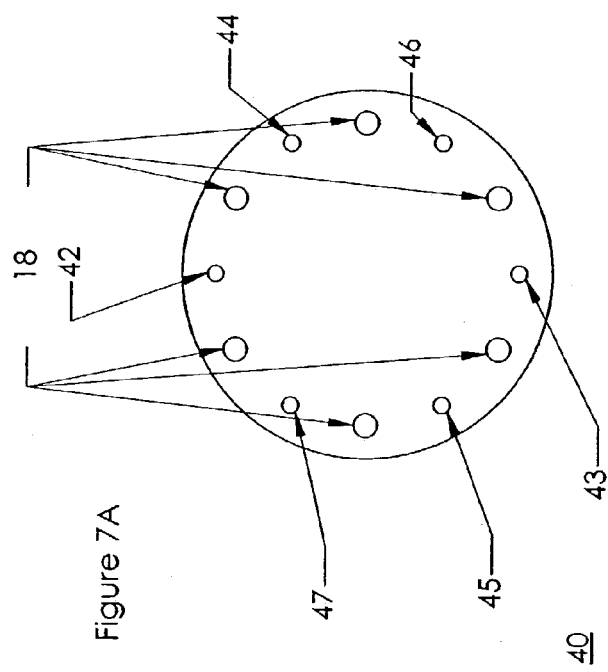

The pressure differential and time required to accomplish the sealing process is a function of the materials used in the fuel cell cassette construction. These include the type of flow field (i.e. the mesh size of the metal screen), the viscosity and flow characteristics of the resin, and the type of gas diffusion layer used in the MEA. Those skilled in the art will be able to judge the appropriate time and pressure based on these parameters. Those practicing the invention may also ascertain the most appropriate time and pressure by visual inspection during the sealing process with the use of transparent molds through which the resin progress can be seen in the topmost layer of the assembly. FIG. 7 shows another alternative pattern for the components that relies on the same methodology. As the flow field pattern has a three-fold symmetry axis at its center, the same screen pattern can be used for each flow (rotated by 60 degrees).

Figure 8:
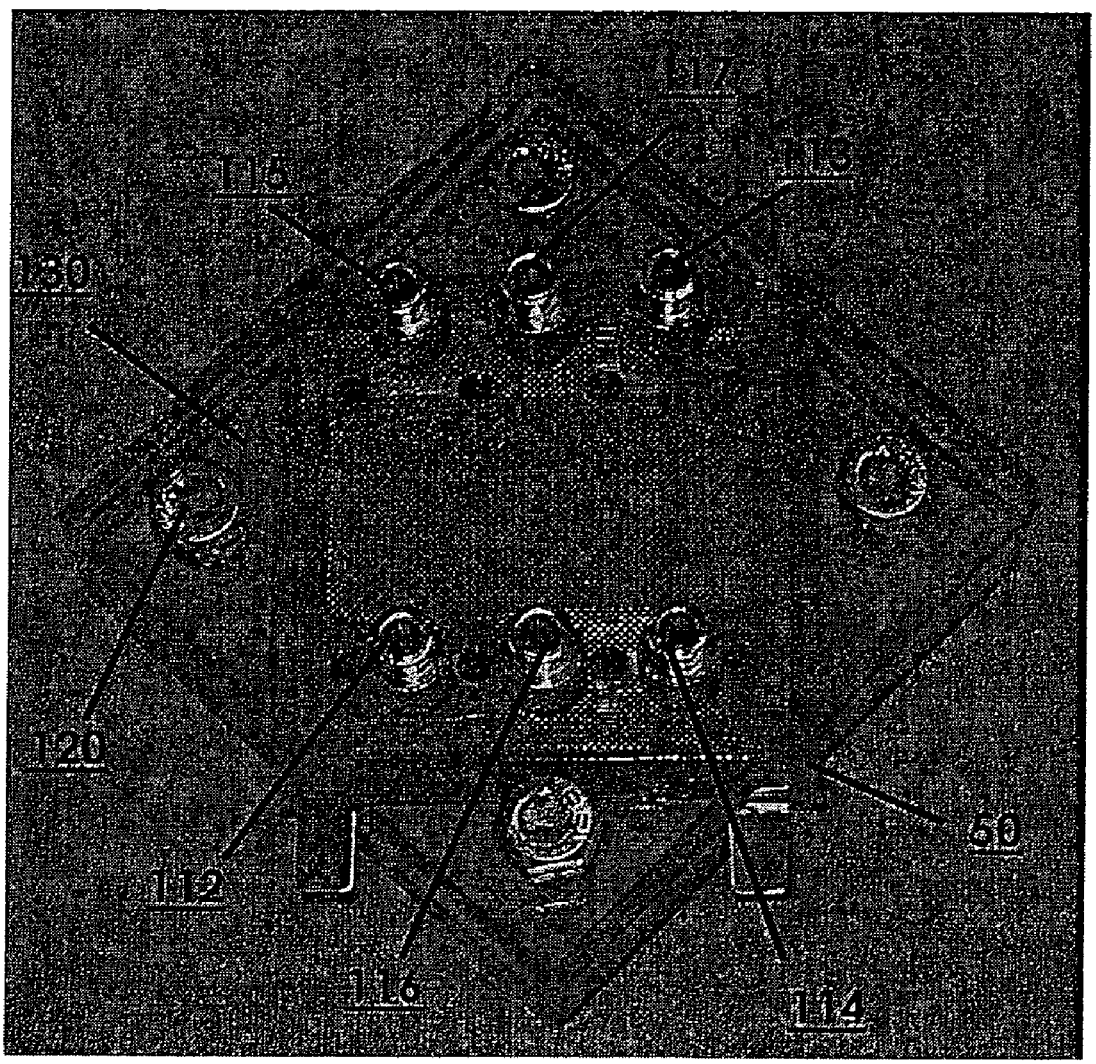
FIG. 8 shows a fuel cell stack assembled in accordance with the invention from the fuel cell cassettes described herein.
Figure 9:
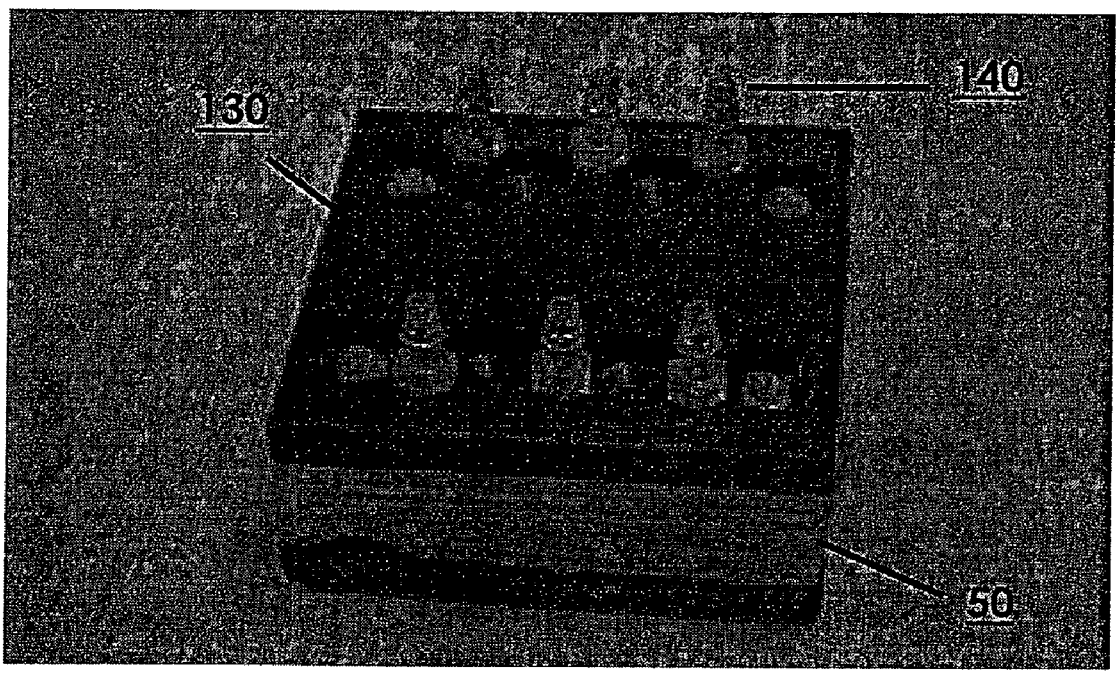
FIG. 9 shows a fuel cell stack assembled in accordance with the invention with the stack end plates incorporated during the cassette encapsulation step.

Referring to FIGS. 8-9, the encapsulated fuel cell cassette 50 or an assembly of such fuel cell cassettes 50 may be secured between end plates 130 that provide the appropriate manifolding of the fuel (114 and 115), oxidant (112 and 113), and coolant (116 and 117) streams (see FIG. 8) to form the finished fuel cell stack 100. Typical silicone gaskets 140 may be used to seal the interface between the end plates 130 and the cassette 50, with external bolts 120 providing the necessary compression. Alternatively, the above described method of cassette assembly allows for the incorporation of the endplates 130 within the encapsulation step. For example, typical endplates 130 were fashioned from ABS plastic (including the appropriate fittings) with roughly the same dimensions as the fuel cell cassette components. These were included with the cassette assembly during the encapsulation step. Upon encapsulation they were incorporated into the cassette 50, providing external manifolding and connections (see FIG. 9). For stacks operated at low pressure, the encapsulating resin may provide enough integrity and stiffness to keep the stack together during operation. Alternatively, after the encapsulation step, hardened resin in the injection ports can be drilled out and tie-bolts 120, or other such compression means, added to improve compression and stiffness. Several improvements result from the incorporation of the fuel cell stack endplates 130 in the encapsulation step. Not only are the number of steps required to make a finished fuel cell stack 100 reduced, but the last seals in the assembly that require the typical gasket and compression have been removed (as the endplates 130 and cassette 50 are now bound together by the resin) to result in greater seal reliability.

FIG. 8 shows a fuel cell stack 100 assembled in accordance with the invention from the fuel cell cassettes 50 described herein. To form the fuel cell stack 100, the fuel cell cassette 50 is fixed between polycarbonate endplates 130 with the appropriate gas fittings incorporated (140). The topmost screen of the cassette is a cooling channel 40.

Referring in particular to FIG. 9, to form the fuel cell stack 100, the fuel cell cassette 50 and ABS endplates 130 (with the appropriate gas fittings 140 incorporated) are encapsulated together.

The novel design of the present invention provides notable benefits as compared with conventional cassettes and related methods. For example, in accordance with the present invention, all of the components in the cassette can be cut prior to the assembly and encapsulation steps. This alone provides several advantages:

The ports are sealed by adhesion of the resin to the stack components, not by compression of the endplates or other compression means. This reduces the compression required on the final stack, improves the reliability of the seal and allows for the use of softer resins.

All of the components are in good electrical contact before the encapsulation event, resulting in low contact resistance throughout.

All of the components can be cut via standard, high volume production techniques: including punching, stamping, die cutting, or laser cutting.

Tolerances are significantly improved. For example, using traditional cassette and stack technology, specifications for adequate sealing are necessarily very tight. Using the present invention, ports are sealed by adhesion and this ensures that good electrical contact is maintained, thus permitting broader tolerances.

Assembly of the cassette prior to encapsulation is relatively facile.

The encapsulation step requires a relatively simple mold.

The encapsulation step is compatible with injection molding processes (in addition to the vacuum assisted resin transfer molding).

Both the assembly and encapsulation steps are conducive to automation, leading to further reductions in cost.

End plate pieces which provide compression and connections to external flow can be molded into the cassette thereby producing the entire stack (cassette+end plates) in one step (e.g., "one-step fabrication").

The invention is further illustrated by the following non-limiting Examples.

EXAMPLES OF THE INVENTION

Example 1

Using the patterns shown in FIGS. 3A and 3B, flow fields were laser cut from 40 mesh 316 stainless steel screen. Separator plates were cut from 0.006" stainless steel plate according to the pattern in FIG. 1. MEAs were made via know processes and cut according to the pattern in FIG. 1. Several of each of these pieces were layered in a mold as shown in FIG. 4. The assembly was encapsulated with the silicone resin, Silastic M, (available commercially from The Dow Corning Corporation of Midland, Mich., U.S.A.) by applying a vacuum of 2 inches Hg for approximately 20 seconds.

Example 2

Using the patterns shown in FIGS. 3A and 3B, flow fields were laser cut from 40 mesh 316 stainless steel screen. Separator plates were cut from 0.006" stainless steel plate according to the pattern in FIG. 1. MEAs were made via know processes and cut according to the pattern in FIG. 1. Several of each of these pieces were layered in a mold as shown in FIG. 4. The assembly was encapsulated with the silicon resin, CR19-2186 (available commercially from the Nusil Technology Corporation of Carpinteria, Calif., USA) by applying a vacuum of 3 inches of Hg for approximately 25 seconds.

Results.

Figure 10:
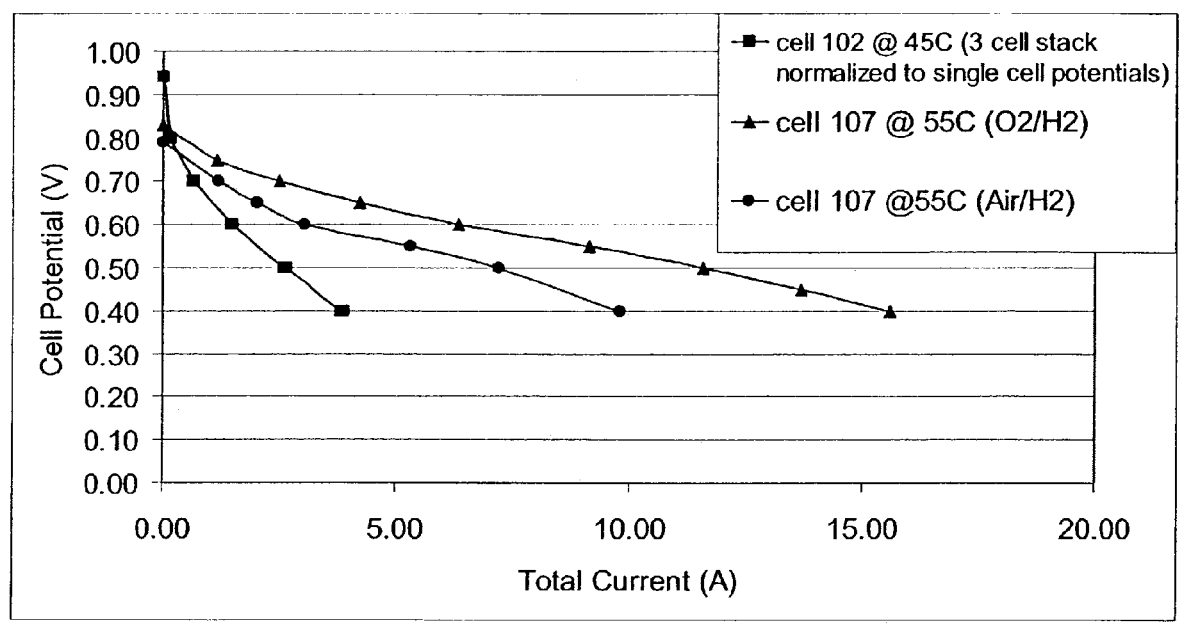
FIG. 10 shows a current/voltage curve for several single cell stacks made via a preferred embodiment of the invention, as further described in the Examples.

Several fuel cell cassettes and fuel cell stacks manufactured therefrom have been made according to the invention described above. Some of these fuel cell cassette designs include up to 18 active MEA layers (and associated flow fields), and multiple cooling layers. Fuel cell test results from a fuel cell stack comprised of a single cell fuel cell cassette and a three layer cassette are shown in FIG. 10. Note that in FIG. 10, the embodiment of Example 1 is shown as "Cell 107", and the embodiment of Example 2 is shown as "Cell 102".

Injection Molding.

Few changes would be made in the above described scheme to employ injection molding. With the use of two part resins (like the silicone used in examples 1 and 2), we have shown that the resin can be injected into the channels by a driving pressure rather than pulling a vacuum on the internal ports. For traditional injection molding of a thermoplastic resin, the mold used would have to accommodate the temperature and pressure associated. Molten resin would be injected into the injection holes and around the edges of the assembly, allowed to cool and harden. Injection velocity profile, pack pressure, and cooling time would be optimized to minimize the possibility of component damage as well as to control shrinkage/warpage ensuring sealing of the final part. Lastly, the fuel cell cassette would be removed from the mold.

Filtration Cassettes.

The extension of the innovation described above to filtration cassettes would allow for a substantial reduction in the labor required for their fabrication as well. Filtration cassettes have a different unit cell component, wherein each unit cell is comprised of a piece of filter membrane with a feed screen on one side and a filtrate screen on the other. Each unit cell is separated by a solid plastic separator (similar to the separator plates used above). This unit cell may be repeated as many times as required to achieve the desired filtration cassette design. Following the above description on our innovation regarding the fuel cell cassette, one can envision the assembly of a filtration cassette with the appropriate changes in materials and unit cell (as described). Some commercial cassettes employ unit cells different than the simplest described here, but the extension of the concepts described above could be readily applied to any such until cell employed for use in filtration cassettes.

The foregoing description of the present invention is merely illustrative thereof, and it is understood that variations and modification can be made without departing from the spirit or scope of the invention.

We claim:

1. A fuel cell cassette comprising:
  a membrane electrode assembly, a fuel flow field, and an oxidant flow field, each component having at least one reactant manifold opening extending through the thickness thereof and at least one sealant manifold opening extending through the thickness thereof;
  wherein the membrane electrode assembly, the fuel flow field, and the oxidant flow field are assembled relative to each other such that the respective reactant manifold openings are aligned, and at least a portion of the respective sealant manifold openings are aligned; and
  wherein a resin is introduced into the peripheral edges of the membrane electrode assembly, the fuel flow field, and the oxidant flow field to encapsulate the periphery of the fuel cell cassette, and a sealant is introduced into the sealant manifold openings to enclose those reactant manifold openings which are not intended to deliver material to a particular flow field.

2. The fuel cell cassette of claim 1 further comprising:
  a non-porous separator plate having at least one manifold opening extending through the thickness thereof and at least one sealant manifold opening extending through the thickness thereof;
  wherein the membrane electrode assembly, the fuel flow field, the oxidant flow field, and the non-porous separator plate are assembled relative to each other such that the respective reactant manifold openings are aligned, and at least a portion of the respective sealant manifold openings are aligned; and
  wherein a resin is introduced into the peripheral edges of the membrane electrode assembly, the fuel flow field, the oxidant flow field, and the non-porous separator plate to encapsulate the periphery of the fuel cell cassette, and a sealant is introduced into the sealant manifold openings to enclose those reactant manifold openings which are not intended to deliver material to a particular flow field.

3. The fuel cell cassette of claim 2 further comprising:
  a coolant flow field having at least two manifold openings extending through the thickness thereof and at least one sealant manifold opening extending through the thickness thereof;
  wherein the membrane electrode assembly, the fuel flow field, the oxidant flow field, the non-porous separator plate, and the coolant flow field are assembled relative to each other such that the respective reactant manifold openings are aligned, and at least a portion of the respective sealant manifold openings are aligned; and
  wherein a resin is introduced into the peripheral edges of the membrane electrode assembly, the fuel flow field, the oxidant flow field, non-porous separator plate, and the coolant flow field to encapsulate the periphery of the fuel cell cassette, and a sealant is introduced into the sealant manifold openings to enclose those reactant manifold openings which are not intended to deliver material to a particular flow field.

4. The fuel cell cassette of any one of claims 1-3, wherein the resin applied to the periphery of the fuel cell cassette is in contact with at least a portion of the sealant introduced into the sealant manifold.

5. The fuel cell cassette of claim 1, wherein the sealant introduced into the sealant manifold substantially encloses a reagent manifold opening which is not intended to deliver material to a particular flow field.

6. The fuel cell cassette of claim 1, wherein the sealant manifold comprises at least one aperture opening to the peripheral edge of one or more layers of the cassette such that the resin is introduced into the sealant manifold during encapsulation of the cassette.

7. The fuel cell cassette of claim 1, wherein at least one of the sealant and the resin is a thermoset material or a thermoplastic material.

8. The fuel cell cassette of claim 7, wherein at least one of the sealant and the resin is a silicone.

9. The fuel cell cassette of claim 1, wherein the resin and the sealant are composed of the same material.

10. The fuel cell cassette of claim 1, wherein the oxidant flow field comprises at least one aperture which is exposed to ambient atmosphere.

11. The fuel cell cassette of claim 2, the cassette comprising:
a membrane electrode assembly having at least one reactant manifold opening extending through the thickness thereof and at least one sealant manifold opening extending through the thickness thereof;
a bipolar plate comprising an oxidant flow field, a fuel flow field, and a separator plate wherein the separator plate is interposed between the fuel flow field and the oxidant flow field and wherein the bipolar plate has at least one manifold opening extending through the thickness thereof and at least one sealant manifold opening extending through the thickness thereof;
wherein the membrane electrode assembly, and the bipolar plate are assembled relative to each other such that the reactant manifold openings are aligned, and at least a portion of each sealant manifold openings are aligned; and
wherein the peripheral edges of the membrane electrode assembly, the bipolar plate are encapsulated together by a resin such that the periphery of the fuel cell cassette is encapsulated by the resin and a sealant is introduced into the sealant manifold openings to enclose those manifold openings which are not intended to deliver material to a particular membrane or flow field.

12. A fuel cell stack comprising:
(a) at least one fuel cell cassette comprising:
a membrane electrode assembly, a fuel flow field, and an oxidant flow field, each having at least one reactant manifold opening extending through the thickness thereof and at least one sealant manifold opening extending through the thickness thereof;
(b) at least one end plate having one or more openings which align with the reactant manifold opening(s);
wherein a resin is introduced into the peripheral edges of the membrane electrode assembly, the fuel flow field, and the oxidant flow field to encapsulate the periphery of the fuel cell cassette, and a sealant is introduced into the sealant manifold openings to enclose those reactant manifold openings which are not intended to deliver material to a particular flow field; and
wherein the end plate is assembled on the top and/or bottom of the stack of fuel cell cassettes such that the openings in the end plate align with the fuel flow field manifold openings, the oxidant flow field manifold openings, and at least a portion of each sealant manifold openings of the fuel cell cassette.

13. The fuel cell stack of claim 12, wherein the resin applied to the periphery of the fuel cell cassette is in contact with at least a portion of the sealant introduced into the sealant manifold.

14. The fuel cell stack of claim 12, wherein the end plate is assembled with the fuel cell cassette(s) prior to encapsulation by the resin and prior to introduction of the sealant such that the end plate and fuel cell cassette(s) are encapsulated and sealed in combination.

15. The fuel cell stack of claim 12, wherein after sealing and encapsulation of the fuel cells stack, at least a portion of the sealant is removed from at least one of the sealant manifold openings and a compression means is inserted into the empty sealant manifold opening to provide additional compressive force to the fuel cell stack.

16. The fuel cell stack of claim 12, wherein the end plate is attached to one or more fuel cell cassettes after encapsulation by the resin and introduction of the sealant into the sealant manifold openings.

17. The fuel cell stack of claim 16, wherein the end plate is attached by a compressive seal.

18. The fuel cell stack of claim 17, wherein after sealing and encapsulating of one or more fuel cells cassettes, at least a portion of the sealant is removed from at least one of the sealant manifold openings and a compression means is inserted into the empty sealant manifold opening to provide additional compressive force to the fuel cell stack.

19. The fuel cell stack of claim 12, wherein at least one of the sealant or the resin is a thermoplastic material or a thermoset material.

20. The fuel cell stack of claim 12, wherein at least one of the end plates is composed of a thermoset polymer, a thermoplastic polymer, metal or a metal alloy.

21. The fuel cell stack of claim 12, wherein at least one of the end plates is composed of a filled polymer composite.

22. The fuel cell stack of claim 21, wherein the filled polymer composite is a glass fiber reinforced thermoplastic or a graphite reinforced thermoplastic.

23. A cassette suitable for use in electrochemical or ion exchange applications comprising:
a membrane assembly having at least one reagent manifold opening extending through the thickness thereof and at least one sealant manifold opening extending through the thickness thereof;
a first reagent flow field having at least one reagent manifold opening extending through the thickness thereof and at least one sealant manifold opening extending through the thickness thereof;
an second reagent flow field having at least one reagent manifold opening extending through the thickness thereof and at least one sealant manifold opening extending through the thickness thereof;
wherein the membrane assembly, the first reagent flow field, and the second reagent flow field are assembled relative to each other such that the reagent manifold openings are aligned, and at least a portion of each sealant manifold openings are aligned; and wherein a resin is introduced into the peripheral edges of the membrane assembly, the first reagent flow field, and the second reagent flow field to encapsulate the periphery of the fuel cell cassette, and a sealant is introduced into the sealant manifold openings to enclose those reactant manifold openings which are not intended to deliver material to a particular flow field.

24. The cassette of claim 23, wherein the resin applied to the periphery of the fuel cell cassette is in contact with at least a portion of the sealant introduced into the sealant manifold.

25. The cassette of claim 23, wherein the membrane assembly further comprises at least two electrodes.

26. A fuel cell cassette comprising:
a membrane electrode assembly having at least one reactant manifold opening extending through the thickness thereof,
a fuel flow field having at least one reactant manifold opening extending through the thickness thereof and having at least one sealant manifold channel having an aperture opening to the peripheral edge of the fuel flow field and extending through the thickness thereof, and
an oxidant flow field having at least one reactant manifold opening extending through the thickness thereof and having at least one sealant manifold channel having an aperture opening to the peripheral edge of the oxidant flow field and extending through the thickness thereof;
wherein the membrane electrode assembly, the fuel flow field, and the oxidant flow field are assembled relative to each other such that the respective reactant manifold openings are aligned; and
wherein a resin is introduced into the peripheral edges of the membrane electrode assembly, the fuel flow field, and the oxidant flow field to encapsulate the periphery of the fuel cell cassette, and a sealant is introduced into the sealant manifold channels to enclose those reactant manifold openings which are not intended to deliver material to a particular flow field; and
wherein the sealant manifold comprises at least one aperture opening to the peripheral edge of one or more layers of the cassette such that the resin is introduced into the sealant manifold during encapsulation of the cassette.

27. A stack suitable for use in electrochemical or ion exchange applications comprising:
(a) at least one cassette suitable for use in electrochemical or ion exchange applications comprising:
a membrane assembly, a first reagent flow field, and a second reagent flow field, each component having at least one reagent manifold opening extending through the thickness thereof and at least one sealant manifold opening extending through the thickness thereof;
wherein a resin is introduced into the peripheral edges of the membrane assembly, the first reagent flow field, and the second reagent flow field to encapsulate the periphery of the fuel cell cassette, and a sealant is introduced into the sealant manifold openings to enclose those reactant manifold openings which are not intended to deliver material to a particular flow field; and
(b) at least one end plate having openings which align with the reagent manifold openings;
wherein each cassette is assembled in a stack relative to each other such that the reagent manifold openings are aligned, and at least a portion of the sealant manifold openings are aligned; and
wherein the end plate is assembled on the top and/or bottom of the stack of cassettes such that the openings in the end plate align with the reagent manifold openings.

28. The stack of claim 27, wherein the resin applied to the periphery of the fuel cell cassette is in contact with at least a portion of the sealant introduced into the sealant manifold.

29. The stack of claim 27, wherein the membrane assembly further comprises at least two electrodes.

30. The stack of claim 27, wherein the end plate is assembled with the cassette(s) prior to encapsulation by the resin and prior to introduction of the sealant such that the end plate and the cassette(s) are encapsulated and sealed in combination wherein at least a portion of each sealant manifold opening aligns with an opening in the end plate.

31. The stack of claim 27, wherein the end plate is attached to the cassette(s) after encapsulation in resin and introduction of the sealant into the sealant manifold openings.

32. The stack of claim 27 wherein the end plate is attached by a compressive seal.

33. The stack of claim 27, wherein after sealing and encapsulating the cassettes, at least a portion of the sealant is removed from at least one of the sealant manifold openings and a compression means is inserted into the empty sealant manifold opening to provide additional compressive force to the fuel cell stack.

* * * * *